3,565,884
DISPERSE MONOAZO DYES DERIVED FROM 3-AMINODIPHENYLENE OXIDES

Armin Haag, Grosssachsen, Germany, assignor to Badische Anilin- & Soda-Fabrik Aktiengesellschaft, Ludwigshafen (Rhine), Germany
No Drawing. Filed Aug. 14, 1968, Ser. No. 752,456
Claims priority, application Germany, Aug. 16, 1967,
P 16 44 065.6
Int. Cl. C09b 29/38; D06p 1/02
U.S. Cl. 260—162                3 Claims

ABSTRACT OF THE DISCLOSURE

Disperse dyes derived from 3-aminodiphenylene oxides and pyrazolones for dyeing synthetic organic fibers such as cellulose ester and synthetic polyester material.

This invention relates to disperse dyes having the Formula I:

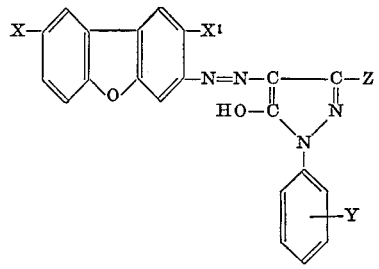

(I)

in which X denotes a hydrogen, chlorine or bromine atom, $X^1$ denotes a hydrogen, chlorine or bromine atom or a low molecular weight alkoxy group, Y denotes a hydrogen or chlorine atom and Z denotes an alkyl, carbalkoxy or carbamoyl group.

Examples of low molecular weight alkoxy groups for $X^1$ are methoxy and ethoxy. Specific examples of Z are methyl, ethyl, carbomethoxy and carboethoxy.

Those dyes are preferred in which X and $X^1$ denote hydrogen atoms.

Preferred dyes falling within the scope of this invention are therefore (a)
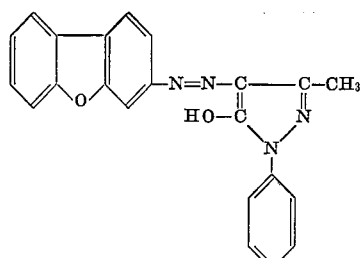

(b)
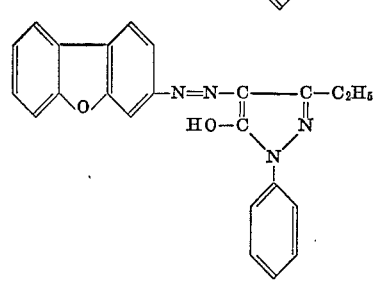

(c)
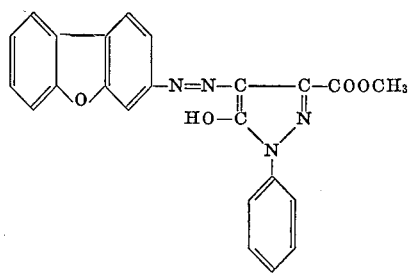

(d)
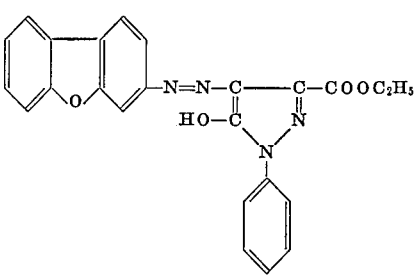

(e)
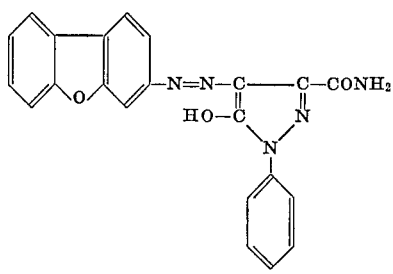

(f)
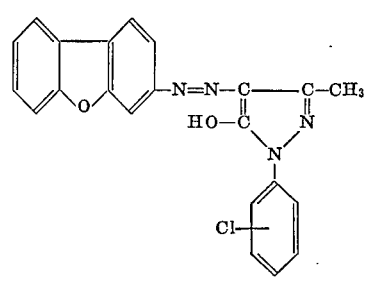

(g)
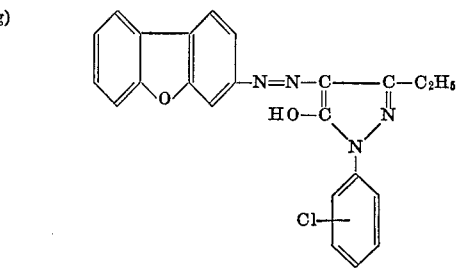

(h)
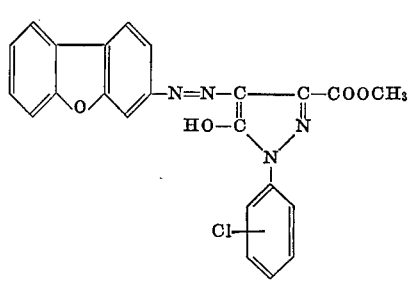

(i) 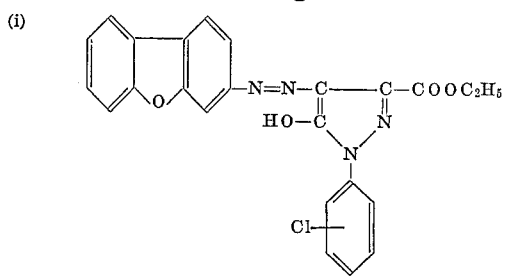

and (j) 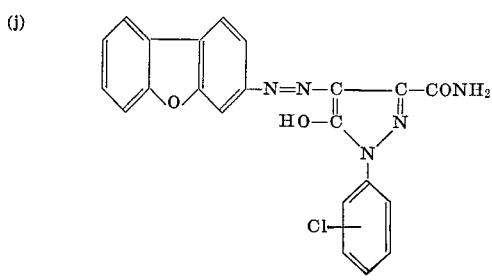

Compounds having the Formula I may be obtained for example by coupling a diazo compound of an amine having the general Formula II:

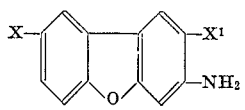

(II)

with a pyrazolone having the general Formula III:

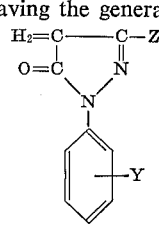

(III)

in which X, $X^1$, Y and Z have the above meanings.

The new dyes are suitable for dyeing synthetic organic fibers, for example of secondary cellulose acetate, cellulose triacetate and particularly polyesters, such as polyethylene glycol terephthalate. Dyeings having excellent thermal stability and good fastness to light are obtained. They can be applied according to the well-known methods of dyeing with disperse dyes.

The invention is illustrated by the following examples. The parts and percentages given in the examples are by weight.

EXAMPLE 1

12 parts of 3-aminodiphenylene oxide is stirred in 100 parts of water and 30 parts of concentrated hydrochloric acid for fifteen minutes. After 150 parts of ice has been added, the amine is diazotized by adding 4.6 parts of sodium nitrite in a solution of 20 parts of water at a temperature of from 0° to 5° C. The diazo solution is then coupled with a solution of 13.3 parts of 1-phenylpyrazolone amide in 200 parts of 10% caustic soda solution and 100 parts of 5% sodium carbonate solution. When coupling is over at about 10° C., the whole is stirred for another hour, the reaction mixture is acidified slightly and the red dye is suction filtered. The yield is 24 parts having a melting point of 262° to 264° C. The very strong dye gives dyeings having good light fastness and excellent thermal stability on polyesters. The dye has the Formula e.

Dyes which give dyeings in the shades indicated on polyester fibers are obtained from the components set out in the following table by a method analogous to that of Example 1:

| Example: | Amine | Coupling component | Shade |
|---|---|---|---|
| 2 | 3-aminodiphenylene oxide | 1-phenyl-3-carbethoxy-pyrazolone | Orange. |
| 3 | Same as above | 1-phenyl-3-methyl-pyrazolone | Yellow. |
| 4 | bromo-aminodiphenylene oxide | 1-phenyl-3-carboxamide-pyrazolone | Orange. |
| 5 | Same as above | 1-phenyl-3-carbethoxy-pyrazolone | Do. |
| 6 | methoxy-aminodiphenylene oxide | 1-phenyl-3-carboxamide-pyrazolone | Red. |

| Amine | Coupling component | Shade |
|---|---|---|
| Example: | | |
| 7 ........ Same as above ........ | 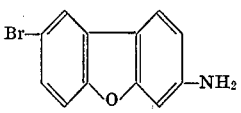 H₂=C——C—COOC₂H₅<br>O=C  N<br> \\ //<br>  N<br>  \|<br>  C₆H₅ | Red. |
| 8 ........ 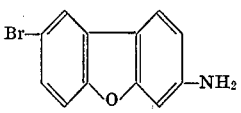 Br—[dibenzofuran]—NH₂ | Same as above ........ | Orange. |
| 9 ........ Same as above ........ | H₂=C——C—CO—NH₂<br>O=C  N<br> \\ //<br>  N<br>  \|<br>  C₆H₅ | Do. |

I claim:
1. A disperse dye having the formula:

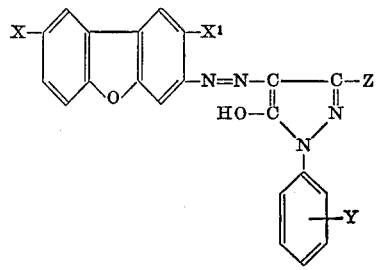

in which X denotes hydrogen, chlorine or bromine, X¹ denotes hydrogen, chlorine, bromine or a low molecular weight alkoxy group, Y denotes hydrogen or chlorine and Z denotes methyl, ethyl, carbomethoxy, carboethoxy or carbamoyl.

2. A disperse dye having the formula:

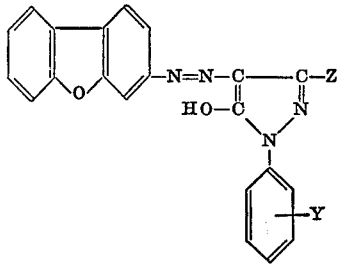

in which Z and Y have the meanings given in claim 1.

3. The dye having the formula:

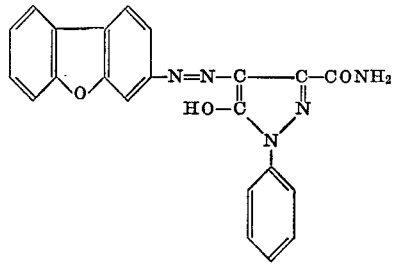

References Cited
UNITED STATES PATENTS
3,150,136   9/1964   Wolfrum et al. ____ 260—162X CHARLES B. PARKER, Primary Examiner D. M. PAPUGA, Assistant Examiner U.S. Cl. X.R.
8—41, 55